(12) United States Patent
Halimaton

(10) Patent No.: US 7,897,648 B2
(45) Date of Patent: Mar. 1, 2011

(54) SILICA AEROGELS

(75) Inventor: Hamdan Halimaton, Skudai (MY)

(73) Assignee: Universiti Teknologi Malaysia, Johor (MY)

( * ) Notice: Subject to any disclaimer, the term of this patent is extended or adjusted under 35 U.S.C. 154(b) by 943 days.

(21) Appl. No.: 10/578,774

(22) PCT Filed: Nov. 1, 2004

(86) PCT No.: PCT/SG2004/000358
§ 371 (c)(1),
(2), (4) Date: Apr. 9, 2007

(87) PCT Pub. No.: WO2005/044727
PCT Pub. Date: May 19, 2005

(65) Prior Publication Data
US 2007/0276051 A1 Nov. 29, 2007

(30) Foreign Application Priority Data
Nov. 10, 2003 (MY) ............... PI 2003 4288

(51) Int. Cl.
C01B 33/159 (2006.01)
C01B 33/158 (2006.01)
C01B 33/157 (2006.01)
C01B 33/14 (2006.01)
B01J 13/00 (2006.01)
C01B 33/152 (2006.01)
C04B 14/04 (2006.01)
E04B 1/74 (2006.01)

(52) U.S. Cl. ......... 516/100; 516/111; 427/220; 428/403; 106/490; 252/62

(58) Field of Classification Search ............ 516/100, 516/111; 427/220; 428/403; 423/338; 106/490; 252/62
See application file for complete search history.

(56) References Cited

U.S. PATENT DOCUMENTS

| | | | | |
|---|---|---|---|---|
| 2,093,454 A | * | 9/1937 | Kistler | 516/98 |
| 2,188,007 A | * | 1/1940 | Kistler | 516/111 |
| 2,249,767 A | * | 7/1941 | Kistler | 423/338 |
| 2,285,449 A | * | 6/1942 | Marshall | 516/34 |
| 2,657,149 A | * | 10/1953 | Iler | 106/490 |
| 2,807,588 A | * | 9/1957 | White et al. | 423/338 |
| 5,133,859 A | * | 7/1992 | Frank et al. | 210/198.2 |
| 6,670,402 B1 | * | 12/2003 | Lee et al. | 516/111 |

FOREIGN PATENT DOCUMENTS

| CN | 1449997 | 10/2003 |
|---|---|---|
| WO | WO 02/066372 | 2/2001 |
| WO | WO 01/85614 | 4/2001 |

OTHER PUBLICATIONS

Derwent Abstract, week 200407, London: Derwent Publications Ltd., AN 2004-063165, Class E36, CN 1449997 A, (Univ Qinghua), abstract, obtained on East Database.*
Conradt et al, "Nano-Structured silica from Rice Husk", Journal of Non-Crystalline Solids, 145 (Aug. 1992) 74-79.*
Qi Tang, Tao Wang, "Preparation of silica aerogel from rice hull ash by supercritical carbon dioxide drying", J. of Supercritical Fluids 35 (2005) 91-94, obtained online @ www.elsevier.com.*
Machine Translation of Chinese Patent, CN 1449997 A, patent document publication date Oct. 22, 2003, obtained online @ http://english.cnipr.com/newenpat/index.htm (downloaded Mar. 22, 2010), pp. 1-10 with patent attached.*
Wagh et al, "Comparison of some physical properties of silica aerogel monoliths synthesized by different precursors", Materials Chemistry and Physics 57 (Jan. 1999) 214-218, Obtained online @ http://www.sciencedirect.com/science/journal/02540584 (downloaded Oct. 25, 2010).*
Stolarski et al, "Synthesis and characteristic of silica aerogels", Applied Catalysis A: General 177 (Feb. 1999) 139-148, Obtained online @ http://www.sciencedirect.com/science/journal/0926860X (downloaded Oct. 25, 2010).*
Kalapathy et al. "An Improved Method for Production of Silica from Rice Hull Ash", Bioresource Technology, V. 85, No. 3, Dec. 2002, pp. 285-289.
Kalapathy et al. "Silica Xerogels From Rice Hull Ash: Structure, Density and Mechanical Strength as Affected by Gelation ph and Silica Concentration", Journal of Chemical Technology and Biotechnology, V. 75 (2000), P. 464-468, Jan. 2003. (Abstract only).

* cited by examiner

*Primary Examiner* — Daniel S Metzmaier
(74) *Attorney, Agent, or Firm* — Preston Smirman; Smirman IP Law, PLLC

(57) ABSTRACT

This invention relates to silica aerogels and to a method for their preparation from rice husk. Rice husk is very rich in silica, and its ash can contain up to 92-97% of amorphous silica. The rice husk ash is prepared by burning the rice husk on a heating plate with excess air until the white ash is obtained. Silica from rice ash husk is in a very active form and has been found to be a very potential starting material for silica aerogels.

12 Claims, No Drawings

SILICA AEROGELS

FIELD OF INVENTION

This invention relates to silica aerogels and to a method for their preparation.

BACKGROUND OF THE INVENTION

An aerogel is a gel in which the liquid phase has been replaced by air without damaging the solid phase leaving a lattice structure of substantially the same shape as the gel and of only slightly reduced volume. Silica aerogels have a lattice structure formed of amorphous silica ($SiO_2$).

Silica aerogels are extremely light materials, having a specific gravity as low as 0.025 $g/cm^3$, the lowest thermal conductivity of any known solid material, high surface area and high porosity. This makes them very suitable for use in many applications. Very low specific gravity aerogels have been used, for example in aerospace applications as insulating materials on space craft, and particularly on the rover vehicle for the Mars Pathfinder project and as Cerenkov detectors for capturing high velocity cosmic particles, which can easily penetrate the porous material, where they are gradually decelerated to achieve a "soft landing". The particles trapped in transparent aerogels can even be inspected in situ. They have been used as catalysts and catalyst supports, where their surface area and porosity makes them especially useful, and in insulation and heat storage systems. There are many instances where aerogels could be used or used to a greater extent were their cost not so high. The cost of aerogels, at present, is high both because of their cost of preparation and the cost of the starting materials.

The first commercially produced aerogels were made by a process that comprises adding sulphuric acid to a solution of sodium silicate with the 30 concentrations being controlled to form a gel having 9% silica content. After the gel has aged for several hours to allow it to strengthen, due to syneresis phenomena, it is passed through a roll crusher into a wash tank where water is passed over the gel to remove the sodium sulphate formed in the gel preparation reaction. When the gel has been sufficiently washed, all excess water is removed by draining and the gel is then covered with alcohol to replace the water in the gel with alcohol. After a suitable soaking time the alcohol is drained off and replaced with fresh alcohol. This alcohol washing procedure is repeated several times.

When the water in the gel has been substantially replaced with alcohol, the excess alcohol is drained off and the gel charged to an autoclave, in which it is slowly heated to a temperature above the critical temperature of the alcohol with the pressure being maintained at a level above the critical pressure of the alcohol. When the temperature reaches the desired level, the pressure is reduced to atmospheric and the autoclave is finally evacuated to a level slightly below atmospheric for a short period.

The success of this process is based on one essential step, namely, the heating of a gel system to temperatures and pressures above the critical temperatures and pressures of the liquid phase of the gel, which allows the liquid phase to be removed without destroying the lattice structure of the gel with consequent formation of a dense xerogel rather than a lightweight aerogel.

This process, while it uses fairly cheap reactants, is extremely time consuming because of the need for the washing and multiple solvent exchange steps.

In attempts to quicken the process it was subsequently found that silica aerogels could be produced using tetramethyl orthosilicate (TMOS) as starting material. In this method of operation TMOS is hydrolysed with water in the presence of an acidic or basic catalyst, usually in ethanol. After formation of a silica gel by aging and removal of all remaining water by displacement with alcohol, the gel is dried, as previously, using a super-critical drying technique.

Since TMOS is a dangerous material to use because of its toxicity, its use has now been superseded by tetraethyl and other tetraalkyl orthosilicates that are much safer to use.

Tetraalkyl orthosilicates are however very expensive products and hence the silica aerogels produced from them are similarly expensive and their use is limited to high technology applications. If silica aerogels could be manufactured more cheaply their range of application could be far wider.

The main drawback of the high temperature variants are the severe temperature conditions, causing accelerated aging of the solution-sol-gel samples. It has been proposed to replace the alcohol in the gel with carbon dioxide, which has a very much lower critical temperature than the alcohols generally used, by flushing the vessel and the gel with liquid carbon prior to carrying out the critical drying process.

SUMMARY OF THE INVENTION

Rice husk is a plentiful waste material in all rice growing areas. It is primarily disposed of by open burning, which is, of course, ecologically undesirable, although a small percentage has been used for a variety of purposes. Although rice husk is very rich in silica, and its ash can contain up to 96% of silica, to-date this characteristic has not been exploited to any major extent. The silica from rice ash husk is in a very active form and has been found to be a very useful starting material for silica aerogels.

Accordingly, this invention provides a method for producing silica aerogels by a sodium silicate route, wherein rice husk ash is used as the source of silica. The rice husk ash is prepared by burning the rice husk on a heating plate with excess air until the white ash is obtained.

According to the invention a silica aerogel is produced by dissolving rice husk ash in aqueous sodium hydroxide, preferably at an $Na_2O:SiO_2$ ratio of between 1:3 and 1:4, more preferably about 1:3.33, to produce a sodium silicate solution preferably containing from 1 to 16% by weight of $SiO_2$, adding concentrated sulphuric acid to the resulting water glass solution to convert the sodium silicate to silica and produce a silica hydrogel, aging the hydrogel to allow the gel structure to develop, preferably for a period of up to 40 days, displacing the water with a $C_1$ to $C_4$ alcohol, preferably methanol or ethanol, to produce an alcogel, and subjecting the alcogel, optionally after replacing the alcohol by carbon dioxide, to super critical drying to form an aerogel.

The method of the invention allows the preparation of mesoporous aerogels having an average pore diameter of between 2 and 50 nm, usually about 20 nm, and a BET surface area of between 600 and 800 $m^2 g^{-1}$. Their specific gravity lies between 0.03 and 0.07 $g/cm^3$ with the pores accounting for up to 97% of their total volume. Because of this large volume of very small pores they have a low thermal conductivity of between 0.09 and 0.1 $Wm^{-1}K^{-1}$. These values are comparable to those of aerogels made using tetraethyl orthosilicate as starting material but the aerogels are very much cheaper to produce because of the cheaper starting materials.

The water is preferably displaced from the hydrogel using a Soxhlet extraction technique by suspending the sample in the vapour above boiling alcohol in a reflux system while allowing the displaced water to escape.

The super-critical extraction is preferably carried out by placing the alcogel with additional alcohol in an autoclave fitted with a thermocouple and a temperature controller and slowly raising the temperature in the autoclave until the critical temperature and pressure are reached. After a holding time the alcohol vapour is vented by slowly reducing the pressure in the autoclave to atmospheric pressure by a controlled leak and then the temperature is slowly reduced to room temperature. The temperature in the autoclave may be increased, for example at a rate of 50° C./hr for the time necessary to reach the critical temperature and the alcohol vented over a period of one and one half hours. The temperature may be reduced over a period of, for example 12 hours. The amount of additional alcohol should be such that there is sufficient alcohol in the autoclave that the critical pressure is reached but the amount above this amount is only limited by safety requirements.

The aerogels obtained are hydrophilic, having hydroxyl groups on their surface, but can be converted to a hydrophobic form by replacing the hydroxyl groups with alkoxy groups. This may be achieved, for example by passing methanol vapour over a heated sample of the aerogel. The methylation reaction is preferably carried out in a closed system in which the sample is placed in a tube enclosed in an external furnace and extending between a flask containing boiling methanol and a condenser, which is connected back to the flask. The temperature of the furnace may be of the order of 250° C. The samples are preferably out-gassed at a temperature of about 100° C. under a reduced pressure of about $10^{-5}$ Torr for at least 15 hours both before and after the methylation process.

DETAILED DESCRIPTION OF THE PREFERRED EMBODIMENTS

The following Example illustrates the invention:

Rice husk as obtained from the paddy field was washed and dried in open air. The rice husk was then burned on a heating plate at a temperature in the range of 650° C. to 700° C. with excess air until the white ash was obtained. Preferably the combustion temperature is 700° C. due to the rice husk silica burned at this temperature is amorphous to X-Ray Diffraction (XRD) and contains up to 92-97% of silica with a traces amount of cations. XRD is a high-resolution diffraction instrument for structural studies to investigate the atomic scale structure of condensed matter (i.e. crystalline solids, glasses, liquids, powders, mixtures, etc.). Combustion at 700° C. produces the most reactive silica source which predominantly contains pure amorphous $SiO_4$ tetrahedra and no SiOH groups as found in large amount in the amorphous sample. The presence of SiOH groups and crystalline phase in the silica source reduces the reactivity of the silica. 0.7 g of rice husk ash can be produced from 5 g of rice husk combustion which contains up to 92-97% silica. The purity of silica of above 98% can be achieved by washing the rice husk in 1M sulphuric acid solution, followed by air drying prior to combustion. Samples were collected from the center of the ashes and from the fringe. Since silica from rice husk can be prepared under controlled temperature without any chemical treatment, it is a potential source of highly active amorphous silica.

38 grams of the rice husk ash, which contained about 95% silica was dissolved in 14 grams of sodium hydroxide pellets in 450 ml water and stored, with stirring at 90° C. in a PTFE bottle to produce a sodium silicate solution having a silica content of 8% by weight and a ratio of $Na_2O:SiO_2$ of 1:3.33. 100-150 grams of 96% sulphuric acid was then added to 200 g of sodium silicate solution to form a hydrogel. Hydrogels from the two samples of rice husk ash were aged at 25° C. for periods ranging from 1 to 5 days. The hydrogels were thoroughly washed with water to remove the sodium sulphate formed in the conversion from sodium silicate to silica.

Samples of the various aged hydrogels were transferred to cloth bags and converted to alcogels by replacing their water with ethanol by suspending a bag containing a sample in a Soxhlet column fitted with a water-cooled reflux condenser above a flask of boiling ethanol and subjecting the sample to the alcohol vapour for a period of 16 hours.

The alcogels resulting from the ethanol extraction were then subjected to supercritical drying in a 2 litre Parr autoclave. 260 cm$^3$ of the alcogel was placed in the autoclave with 500 ml additional ethanol and after sealing the autoclave the temperature was raised to 275° C. over a period of 7 hours at a rate of 50°/hour to 200° C. and thereafter at 25° C./hour. The temperature was maintained at 275° C. for one hour and the ethanol vapour was then allowed to bleed from the autoclave at such rate that the pressure fell to atmospheric over a period of one and a half hours. The temperature in the autoclave was then reduced to room temperature at a steady rate.

The properties of the various aerogels obtained are listed in the following table.

Physical Properties of Silica Aerogel

| Property | Aerogels of Example | Commercial aerogel |
| --- | --- | --- |
| Apparent density | 0.03-0.06 g/cm$^3$ | 0.1 g/cm$^3$ |
| Internal Surface Area | 700-900 m$^2$/g | 600-1000 m$^2$/g |
| Mean Pore Diameter | 20.8 nm | 20 nm |
| Particle Diameter | 5 nm | 2-5 nm |
| Thermal Tolerance | to 500 C., mp >1200 C. | to 500 C., mp >1200 C. |
| Thermal Conductivity | 0.099 Wm$^{-1}$K$^{-1}$ | 0.089 Wm$^{-1}$K$^{-1}$ |

The invention claimed is:

1. A method for producing a silica aerogel, comprising:
   combusting rice husk to produce rice husk ash;
   dissolving the rice husk ash in aqueous sodium hydroxide;
   heating and stirring the resultant gel mixture to produce a sodium silicate solution; adding concentrated sulphuric acid to the resulting water glass solution to convert the sodium silicate to silica and produce a silica hydrogel;
   aging the hydrogel to allow the gel structure to develop;
   displacing the water by subjecting the hydrogel to a $C_1$ to $C_4$ alcohol vapor through Soxhlet extraction to produce an alcogel; and
   subjecting the alcogel to super critical drying with additional alcohol to form an aerogel, wherein the additional alcohol is operable to function as a super-critical fluid, wherein the alcogel and the additional alcohol are placed into a container, wherein the additional alcohol is present in an amount sufficient, as the temperature is raised in the container, to permit a critical pressure to be reached.

2. The method according to claim 1 wherein the rice husk is combusted at a temperature in the range of 600° C. to 700° C. with excess air until the rice husk ash is obtained.

3. The method according to claim 1, wherein the rice husk ash contains 92-97% of amorphous silica and trace amounts of cations.

4. The method according to claim 3, wherein the trace amounts of cations are selected from the group consisting of $K^+$, $Ca^{2+}$, $Mg^{2+}$, $Al^{3+}$, $Fe^{3+}$, and combinations thereof.

5. The method according to claim 1, wherein a purity of silica above 98% can be achieved by washing the rice husk in 1M sulphuric acid solution, followed by air drying prior to combustion.

6. The method according to claim 1, wherein the amounts of rice husk ash and sodium hydroxide are such as to give a ratio of $Na_2O:SiO_2$ of between 1:3 and 1:4.

7. The method according to claim 1, wherein the ratio of $Na_2O:SiO_2$ is about 1:3.33.

8. The method according to claim 1, wherein the sodium silicate solution contains from 8 to 10% by weight of $SiO_2$.

9. The method according to claim 8, wherein the sodium silicate solution contains 9% by weight of $SiO_2$.

10. The method according to claim 1, wherein the hydrogel is aged for a period of up to 5 days.

11. The method according to claim 1, wherein the $C_1$ to $C_4$ alcohol is methanol or ethanol.

12. The method according to claim 1, wherein any produced aerogels that are hydrophilic are converted to hydrophobic aerogels by alkylation.

* * * * *